Aug. 20, 1940.   C. HAEHNKE   2,211,928
VEHICLE DOOR SAFETY SECURING APPLIANCE
Filed March 27, 1939   2 Sheets-Sheet 1
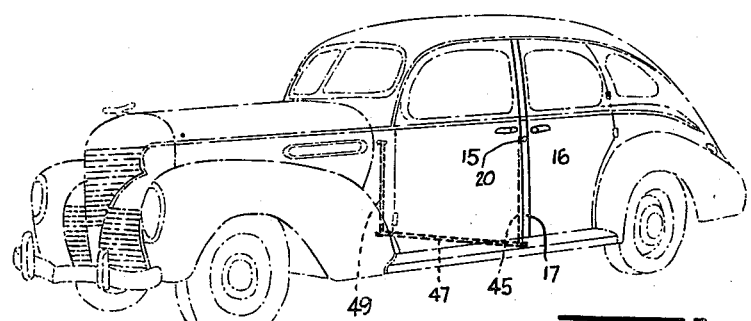
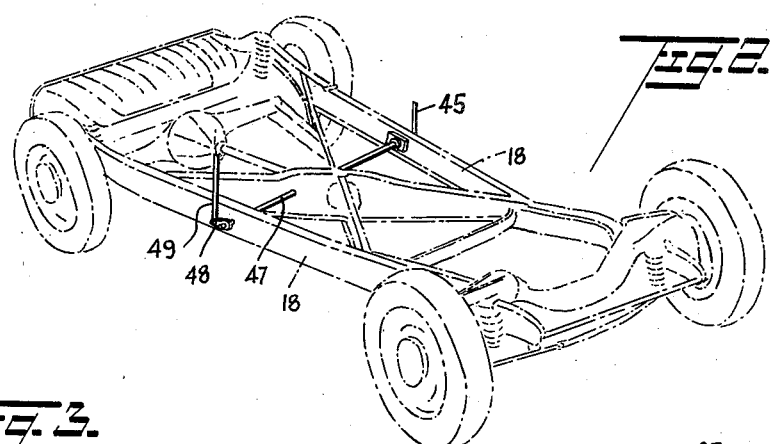
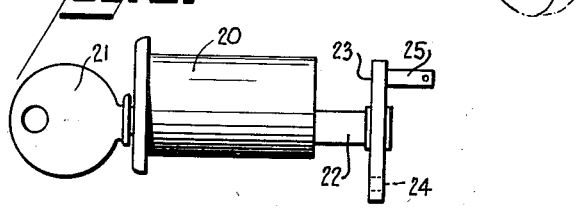
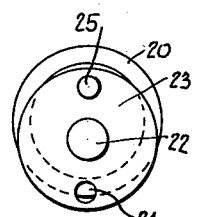
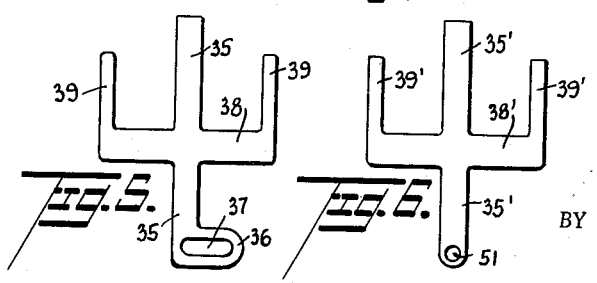
INVENTOR.
CHARLES HAEHNKE.
BY
ATTORNEY.

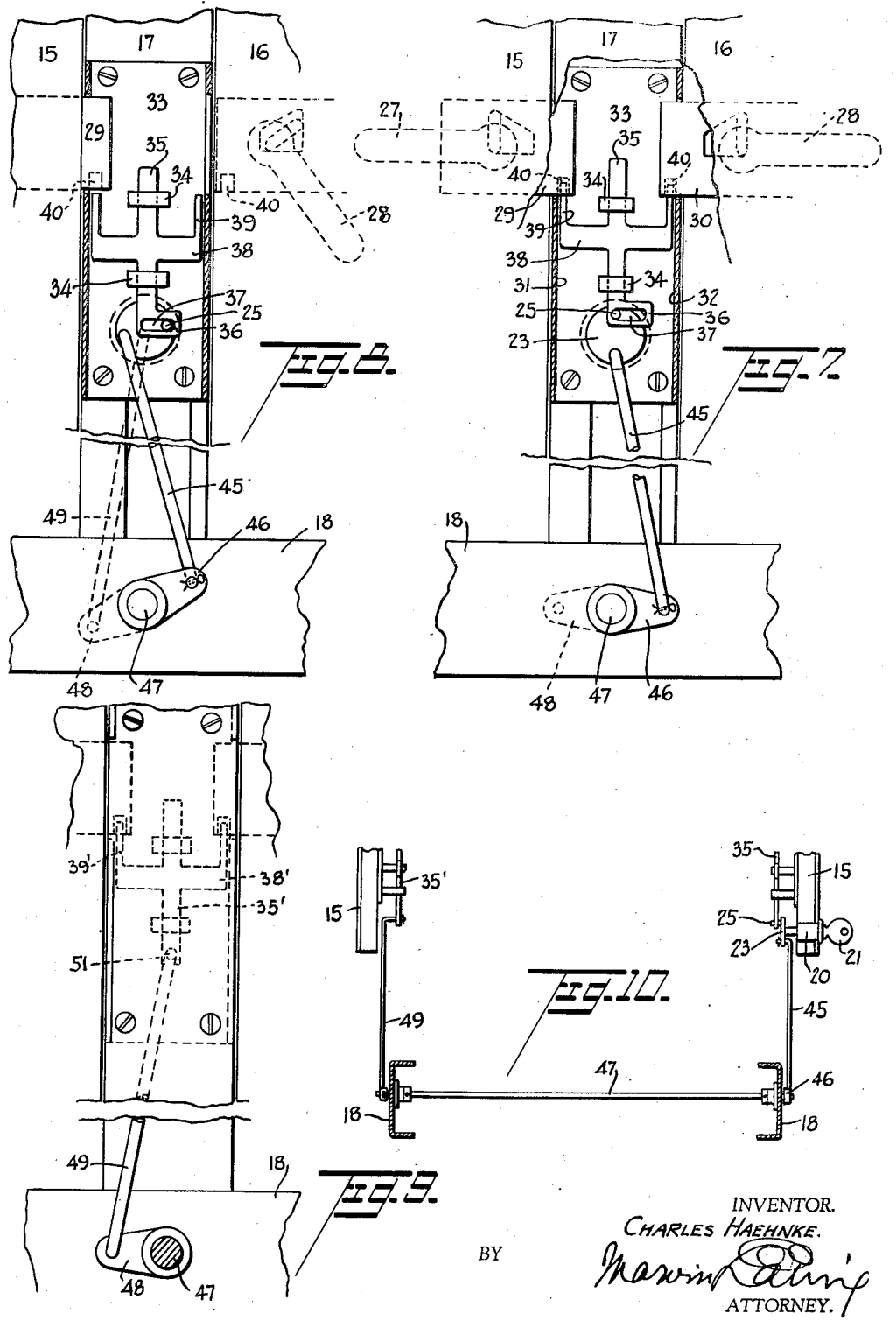

Patented Aug. 20, 1940

2,211,928

UNITED STATES PATENT OFFICE 2,211,928

VEHICLE DOOR SAFETY SECURING APPLIANCE

Charles Haehnke, Jersey City, N. J.

Application March 27, 1939, Serial No. 264,460

1 Claim. (Cl. 70—264)

This invention relates to safety devices for preventing the unwarranted intrusion of persons to a vehicle of the automobile type, when parked or otherwise disposed, during the absence of a driver or authorized agent.

In cars of the type under consideration, having two or more doors, arranged on opposite sides, it is customary to control the opening of one door by a key, the other doors being ordinarily secured from the inside of the car.

It occasionally occurs that the driver fails to fasten such other doors, although locking the door through which exit is made; obviously in such event the car may be entered at will by whomsoever may be so disposed.

It is therefore an object of this invention to provide an effective means for positively securing all of the several doors by a single locking device.

A further feature is in the provision of a simple appliance whereby all doors are locked simultaneously by a single key operable from one point, as at the door most commonly used.

Another purpose is to produce a locking device, simple and inexpensive to construct and install, and which is fool proof in operation.

These objects are attained by the novel construction and combination of parts hereinafter described and shown in the accompanying drawings, forming a material component of this disclosure, and in which:

Figure 1 is a perspective view of a conventional type of car, shown in broken lines, and provided with an embodiment of the invention.

Figure 2 is a similar view of the chassis of the car showing the operative connections of opposite sides of the device.

Figure 3 is a side elevational view of a common form of lock, fitted with the controlling element of the safety means.

Figure 4 is a rear end elevational view of the same.

Figure 5 is a side elevational view of one of the locking elements in detail.

Figure 6 is a similar view of the locking element used on the opposite side of the car.

Figure 7 is a partial side elevational, partial sectional view of the device as applied and in locked position.

Figure 8 is a similar view of the same as in an unlocked position.

Figure 9 is a view similar to Figure 7 but looking at the opposite side of the car.

Figure 10 is a front elevational view showing the method of securing the doors at both sides of the car at one operation.

The car shown in Figure 1 is indicated as having two doors on each side, 15—16 respectively front and rear, while therebetween is an upright door jamb 17 common to both doors, and which is usually provided with keepers to receive the lock bolts.

The car is carried on a chassis or frame composed, in part of two channel beams 18.

Handles are provided on the doors, one of which, usually that at the front, is furnished with a lock, the remaining doors being fastened from within the car.

In the present embodiment, a lock of the tumbler type, generally designated as 20, is provided with a key 21, the barrel of the lock being set in the jamb 17, as seen in Figure 1.

Fixed rigidly on the stem 22 of the lock is a disc 23 in which is an opening 24, while equally spaced, directly opposite is set a pin 25.

Referring now to Figures 7, 8 and 9, the door handles 27—28 are arranged to actuate latch bolts 29—30 in the usual manner, these bolts enterable in keeper openings formed in the opposed flanges 31—32 of a channel bracket 33 fastened to the inner face of the jamb 17.

A pair of longitudinally spaced clips 34 are set in the bracket 33, midway its width, and slidable therein is a bar 35, its lower portion having a lateral projection 36 containing a horizontal slot 37, operatively receptive of the crank-like pin 25 of the lock.

Integral with the bar 35 are opposed lateral arms 38 having reduced upright detents 39 at their ends, these detents engageable in correspondingly shaped and positioned apertures 40 when the latch bolts are in engaging position and the bar 35 raised by the lock in an obvious manner.

Engaged in the disc opening 24 is the upper end of a rod 45, its downreaching end similarly secured in an opening in the outer end of a lever 46 fixed on one end of a shaft 47 journalled in the frame elements 18 and extending under the car to its opposite side.

On the other end of the shaft 47 is fixed another similar lever 48, directed oppositely to the lever 46 and connected therewith is a rod 49 extending upwardly and having its raised end secured in an opening 51 of a bar 35' in other respects identical with the bar 35 and given the same identifying numbers primed.

It will now be seen that a single lock is arranged to control two or more doors at one and the same operation of a key, rendering it highly improbable to leave the car with the doors unlocked.

Having thus described the invention and set forth the manner of its construction and application, what is claimed as new and sought to secure by Letters Patent, is:

In an automobile having front and rear doors in its opposite sides, rigid posts fixed between the doors on each side, and a manually operable latching means for each door, a key controlled lock on one of said posts, a crankpin rotatable by said lock, an upright slidable bar actuable by said pin along the post at one side of the automobile, said bar having an integral cross member provided with upright spaced detents on its ends, a lateral projection on the lower extremity of said bar, said projection having a horizontal slot adapted to receive the crankpin when operated by said lock, a shaft extending transversely below the body of the automobile, opposed cranks fixed on the ends of said shaft, a second similar slidable bar, and a link connecting the last named bar and one of said cranks, said lock when in one position retaining the latching means from movement and releasing the same when the lock is in another position.

CHARLES HAEHNKE.